J. ELLENBERGER.
Nut-Locks.

No. 148,814.    Patented March 24, 1874.

UNITED STATES PATENT OFFICE.

JOSEPH ELLENBERGER, OF EASTON, OHIO.

IMPROVEMENT IN NUT-LOCKS.

Specification forming part of Letters Patent No. 148,814, dated March 24, 1874; application filed March 11, 1873.

*To all whom it may concern:*

Be it known that I, JOSEPH ELLENBERGER, of Easton, in the county of Wayne and State of Ohio, have invented certain new and useful Improvements in Nut-Locks for Railroads; and that the following is a full, clear, and exact specification thereof, which will enable others skilled in the art to make and use the said invention.

My invention relates particularly to an improved device for preventing the nuts used on the bolts for railway-joints from working loose; and it consists in the combination, with the rail-bolt, of an outside nut-bar, with bent ends, which is screwed onto the bolt after the nut is turned on, and which acts, in combination with a key-bar inserted between the sides of the nut and the bent ends of the nut-bar, to hold the nut from turning off until said key-bar is removed, as is hereinafter more fully shown.

Figure 1:
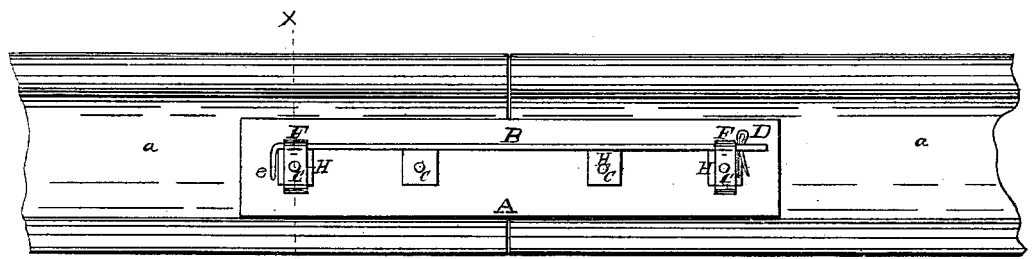
Figure 2:
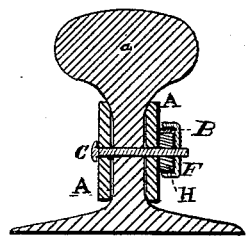
Figure 3:
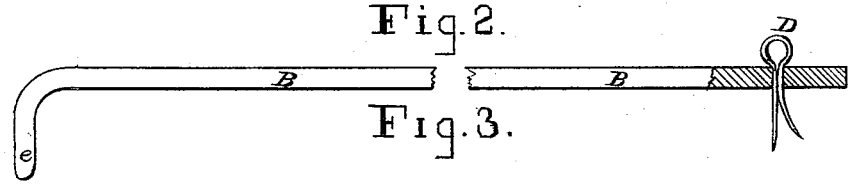
Figure 4:
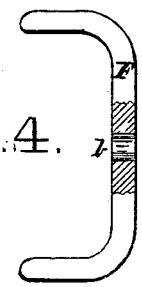

In the accompanying drawing, Figure 1 is a side elevation of a rail-joint embodying my invention. Fig. 2 is a cross-section of the same, through the line $x$ $x$ in Fig. 1. Fig. 3 shows the key-bar for locking the bolts, and Fig. 4 a side view of the bent nut-bar which fits over the nut.

A A are the fish-bars connecting the rails $a$ $a$. Through them, and through the web of the rails, pass bolts C, on which are screwed nuts H. The bent nut-bars F, in which are the holes $b$, are screwed onto the two end bolts outside of the nuts, and the key-bar B, having a bent end, $e$, is inserted between the end nuts H and the bent bars F, and secured by a spring-key, D, as shown in the drawing. The outside bars F have their bent ends lapping over the upper and lower sides of the end nuts H, and must extend either above or below said nuts to admit the key-bar B. Said key-bar is inserted between the outside nuts and their respective nut-bars, either above or below said nut, being of sufficient length to extend over all the nuts, and thus securing the intermediate nuts by resting against one of their sides. After the bar B has been placed in the desired position, the key D is inserted in a hole in the end of said bar, and, in connection with the bent end $e$, prevents the key-bar B from working out, and the bar B holds the nuts H rigidly in place and prevents them from working loose.

The manner of applying this device will be readily seen from the foregoing description. The operator first screws up the nuts H, so as to bring their upper edges in line, then screws on the nut-bars F F, and then inserts the key-bar B, and finally the spring-key D, as before shown.

Should any of the nuts require tightening, the operator withdraws the key D, slides back the key-bar B, and gives the nut a quarter, half, or whole turn, when the bar B can be slid back, as before.

I am aware that nut-fastenings have been constructed, which consisted of a plate placed between the nut and fish-plate, and having a lip on its edge, between which and the nut a key-bar was inserted to fasten the nut, and I expressly disclaim such construction, and confine myself to the herein-described plan of using nut-bars, which are to be screwed onto the bolt outside of the nuts.

What I claim as my invention, and desire to secure by Letters Patent, is—

The bent nut-bars F F and key-bar B, in combination with the bolts C C and nuts H H, said nut-bars being screwed onto the bolts outside of the nuts, and the several parts being arranged and operating substantially as and for the purposes specified.

As evidence of the foregoing, witness my hand this 3d day of March, 1873.

JOSEPH ELLENBERGER.

Witnesses:
 HENRY WINGER,
 LEVI WINGER.